(12) United States Patent
Wilson

(10) Patent No.: US 8,267,649 B2
(45) Date of Patent: Sep. 18, 2012

(54) COUPLING FOR ROTARY COMPONENTS

(75) Inventor: Ian David Wilson, Simpsonville, SC (US)

(73) Assignee: General Electric Company, Schenectady, NY (US)

( * ) Notice: Subject to any disclaimer, the term of this patent is extended or adjusted under 35 U.S.C. 154(b) by 502 days.

(21) Appl. No.: 12/467,213

(22) Filed: May 15, 2009

(65) Prior Publication Data

US 2010/0290904 A1    Nov. 18, 2010

(51) Int. Cl.
*F01D 25/00* (2006.01)
*F16D 11/04* (2006.01)

(52) U.S. Cl. .................. 415/216.1; 192/66.21

(58) Field of Classification Search .......... 415/216.1; 192/66.21
See application file for complete search history.

(56) References Cited

U.S. PATENT DOCUMENTS

| | | | |
|---|---|---|---|
| 4,296,934 A * | 10/1981 | Atkin | 277/411 |
| 5,593,274 A | 1/1997 | Carreno et al. | |
| 6,158,102 A | 12/2000 | Berry et al. | |
| 6,227,799 B1 * | 5/2001 | Kuhn et al. | 415/115 |
| 6,382,903 B1 | 5/2002 | Caruso et al. | |
| 6,435,812 B1 | 8/2002 | Destefano et al. | |
| 6,438,837 B1 | 8/2002 | Berry et al. | |
| 6,464,455 B2 | 10/2002 | Wilson | |
| 6,464,461 B2 | 10/2002 | Wilson et al. | |
| 6,477,773 B1 | 11/2002 | Wilson et al. | |
| 6,506,021 B1 | 1/2003 | Wilson et al. | |
| 7,980,812 B2 * | 7/2011 | McMahon et al. | 415/110 |
| 2001/0014283 A1 | 8/2001 | Wilson | |
| 2009/0053042 A1 | 2/2009 | Wilson et al. | |
| 2010/0105184 A1 * | 4/2010 | Fukuda et al. | 438/299 |
| 2011/0027068 A1 * | 2/2011 | Floyd et al. | 415/13 |
| 2011/0074158 A1 * | 3/2011 | Schroeder | 290/52 |

* cited by examiner

*Primary Examiner* — Alexander Ghyka
(74) *Attorney, Agent, or Firm* — Fletcher Yoder, P.C.

(57) ABSTRACT

A system is disclosed that includes a turbine engine having a first rotary component having a first annular coupling disposed about a rotational axis of the engine. The first annular coupling has an axially converging surface relative to the rotational axis. The system also includes a second rotary component having a second annular coupling disposed about the rotational axis of the turbine engine, wherein the second annular coupling comprises an axially diverging surface such that the axially converging surface of the first annular coupling mates with the axially diverging surface.

24 Claims, 6 Drawing Sheets

COUPLING FOR ROTARY COMPONENTS

BACKGROUND OF THE INVENTION

The subject matter disclosed herein relates to gas turbine engines, and more specifically, to alignment of rotary components and shafts.

In general, gas turbine engines combust a mixture of compressed air and fuel to produce hot combustion gases. The combustion gases may flow through one or more turbine stages to generate power for a load and/or a compressor. The turbine stages including rotary components, such as rotors and blades that rotate about a shaft. To reduce wear and provide operation of the gas turbine engine, the rotary components are generally axially and concentrically aligned. Unfortunately, existing couplings are often complex, exhibit friction wear, create local high stress locations, or lack the ability to be installed in the field.

BRIEF DESCRIPTION OF THE INVENTION

Certain embodiments commensurate in scope with the originally claimed invention are summarized below. These embodiments are not intended to limit the scope of the claimed invention, but rather these embodiments are intended only to provide a brief summary of possible forms of the invention. Indeed, the invention may encompass a variety of forms that may be similar to or different from the embodiments set forth below.

In a first embodiment, a system includes a turbine engine having a first rotary component and a second rotary component. The first rotary component includes a first annular coupling disposed about a rotational axis of the turbine engine, wherein the first annular coupling comprises an axially converging surface relative to the rotational axis. The second rotary component includes a second annular coupling disposed about the rotational axis of the turbine engine, wherein the second annular coupling comprises an axially diverging surface relative to the rotational axis. The axially converting surface of the first annular coupling mates with the axially diverging surface of the second annular coupling.

In a second embodiment, a system includes a shaft disposed about a rotational axis and a wheel disposed about the rotational axis. The wheel includes a plurality of blades, the shaft mates with the wheel along an annular interface, and the annular interface comprises an annular protrusion captured in opposite radial directions by an annular groove circumferentially about the rotational axis.

In a third embodiment, a system includes a self-aligning friction coupling. The self-aligning friction coupling includes a first annular face having an axially converging surface that extends circumferentially about a rotational axis and a second annular face having an axially diverging surface that extends circumferentially about the rotational axis, wherein the axially converging surface mates with the axially diverging surface solely by friction, and the axially converging surface and the axially diverging surface are configured to align first and second rotating components in axial alignment and concentric alignment relative to one another

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

The present disclosure is directed to rotary machines that include a rotary component alignment and torque transmission feature. The rotary machines may include a gas turbine, stream turbine, a hydro turbine, a wind turbine, a compressor, or another rotating assembly. The alignment and torque transmission feature may include a circumferential V-shaped groove in a first rotary component (e.g., wheel) and a corresponding circumferential chevron shaped protrusion in a second rotary component (e.g., shaft). The mating between the V-shaped groove and the chevron shaped protrusion provides axial, radial, and circumferential alignment between the rotary components. For example, the mating between the V-shaped groove and the chevron shaped protrusion may concentrically align the rotary components, i.e., make the components all centered about the same rotational axis. Additional embodiments may include concentric and axial alignment between multiple rotary components, intermediate shafts, or any other suitable component. The alignment and torque transmission feature may transmit torque between rotary components by face friction. During high stress conditions, this technique enables the feature to slip and minimize stress transmitted to the rotary components.

Figure 1:
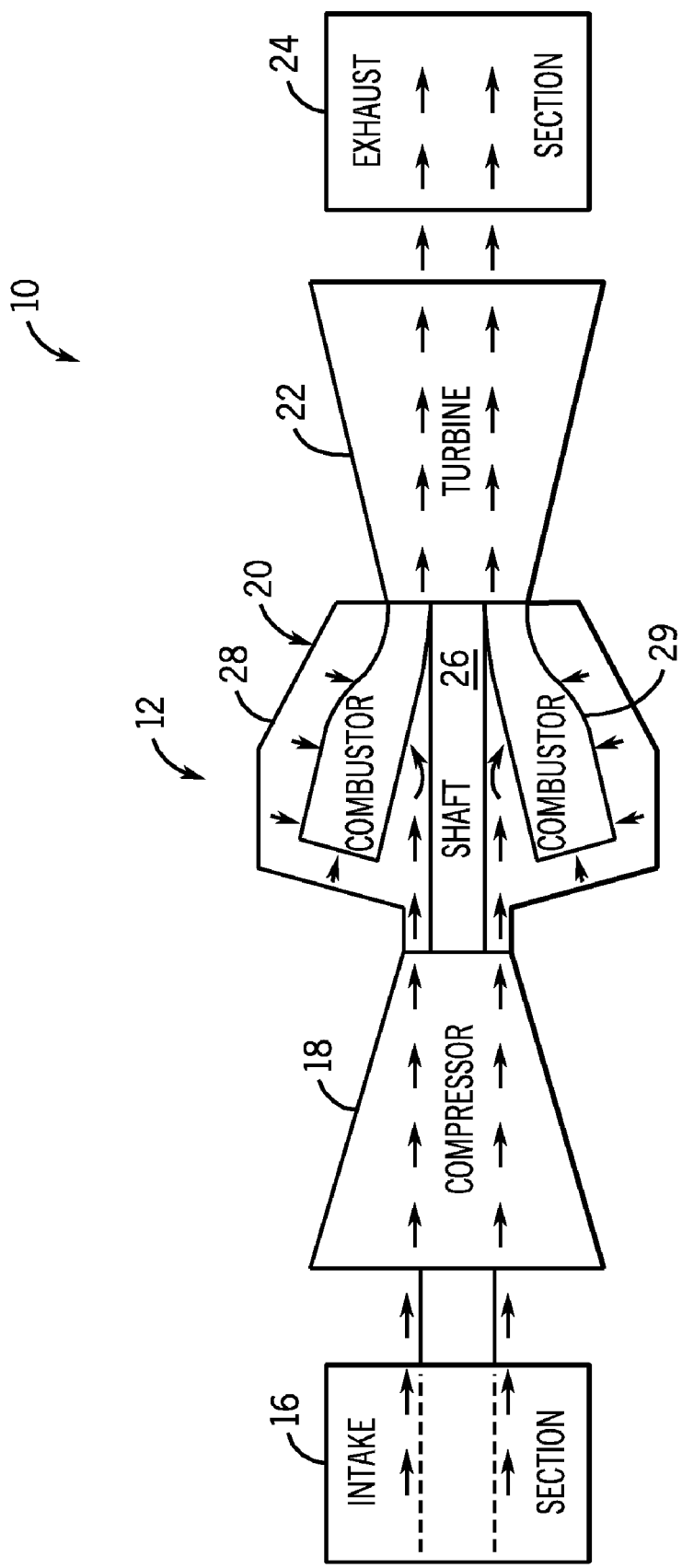
FIG. 1 is a schematic flow diagram of an embodiment of a gas turbine engine.

FIG. 1 is a block diagram of an exemplary system 10 including a gas turbine engine 12 that may employ the alignment and torque transmission feature discussed herein. In certain embodiments, the system 10 may include an aircraft, a watercraft, a locomotive, a power generation system, or combinations thereof. The illustrated gas turbine engine 12 includes an air intake section 16, a compressor 18, a combustor section 20, a turbine 22, and an exhaust section 24. The turbine 22 is coupled to the compressor 18 via a shaft 26.

As indicated by the arrows, air may enter the gas turbine engine 12 through the intake section 16 and flow into the compressor 18, which compresses the air prior to entry into the combustor section 20. The illustrated combustor section 20 includes a combustor housing 28 disposed concentrically or annularly about the shaft 26 between the compressor 18 and the turbine 22. The compressed air from the compressor 18 enters combustors 29 where the compressed air may mix and combust with fuel within the combustors 29 to drive the turbine 22.

From the combustor section 20, the hot combustion gases flow through the turbine 22, driving the compressor 18 via the shaft 26. For example, the combustion gases may apply motive forces to turbine rotor blades within the turbine 22 to rotate the shaft 26. After flowing through the turbine 22, the hot combustion gases may exit the gas turbine engine 12 through the exhaust section 24. Embodiments of an alignment and torque transmission feature, as discussed below, may be used in the compressor, the turbine, or both.

Figure 2:
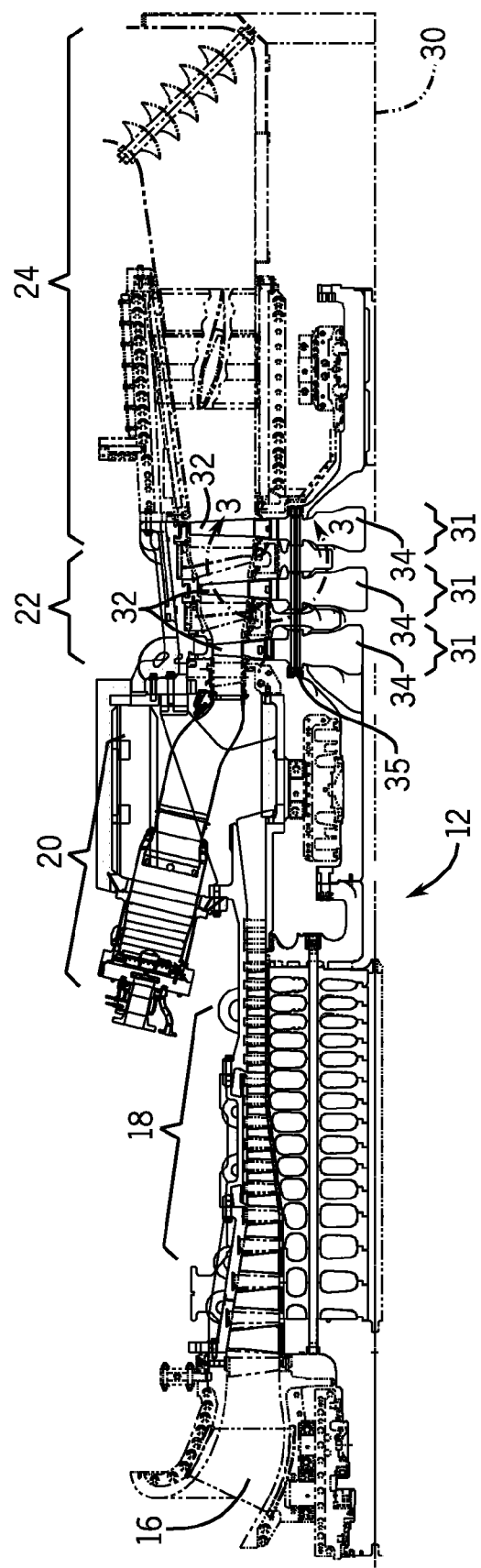
FIG. 2 is a sectional view of the gas turbine engine of FIG. 1 sectioned through the longitudinal axis.

FIG. 2 is a side view of an embodiment of the gas turbine engine 12 of FIG. 1 taken along the longitudinal axis 30. As depicted, the gas turbine 22 may include multiple stages, such as three separate stages 31. Each stage 31 may include rotary components, such as a set of blades 32 coupled to a rotor wheel 34 that may be rotatably attached to the shaft 26 (FIG. 1). In some embodiments, the rotor wheels 34 may be clamped via tie bolts 35 extending through the rotor wheels 34 or other rotary components. In other embodiments, the rotor wheels 34 may be clamped together axially via a central tie bolt that extends through the bores of the rotor wheels 34 or other rotary components.

The blades 32 may extend radially outward from the rotor wheels 34 and may be partially disposed within the path of the hot combustion gases. Seals may extend between and be supported by adjacent rotor wheels 34. Although the gas turbine 22 is illustrated as a three-stage turbine, the seals described herein may be employed in any suitable type of turbine with any number of stages and shafts. For example, the seals may be included in a single stage gas turbine, in a dual turbine system that includes a low-pressure turbine and a high-pressure turbine, or in a steam turbine. Further, the seals described herein may also be employed in a rotary compressor, such as the compressor 18 illustrated in FIG. 1.

As described above with respect to FIG. 1, air may enter through the air intake section 16 and be compressed by the compressor 18. The compressed air from the compressor 18 may then be directed into the combustor section 20 where the compressed air may be mixed with fuel gas. The mixture of compressed air and fuel gas is generally burned within the combustor section 20 to generate high-temperature, high-pressure combustion gases, which may be used to generate torque within the turbine 22. Specifically, the combustion gases may apply motive forces to the blades 32 to turn the wheels 34. Thus, the rotary components, e.g., the blades 32 and wheels 34, may transmit torque to the shaft 26. High operating temperature may introduce or increase stresses on the rotary components and the shaft 26. For example, the hot combustion gases may flow into the interstage volume between turbine wheels 34, which may place thermal stresses on the turbine components.

Figure 3:
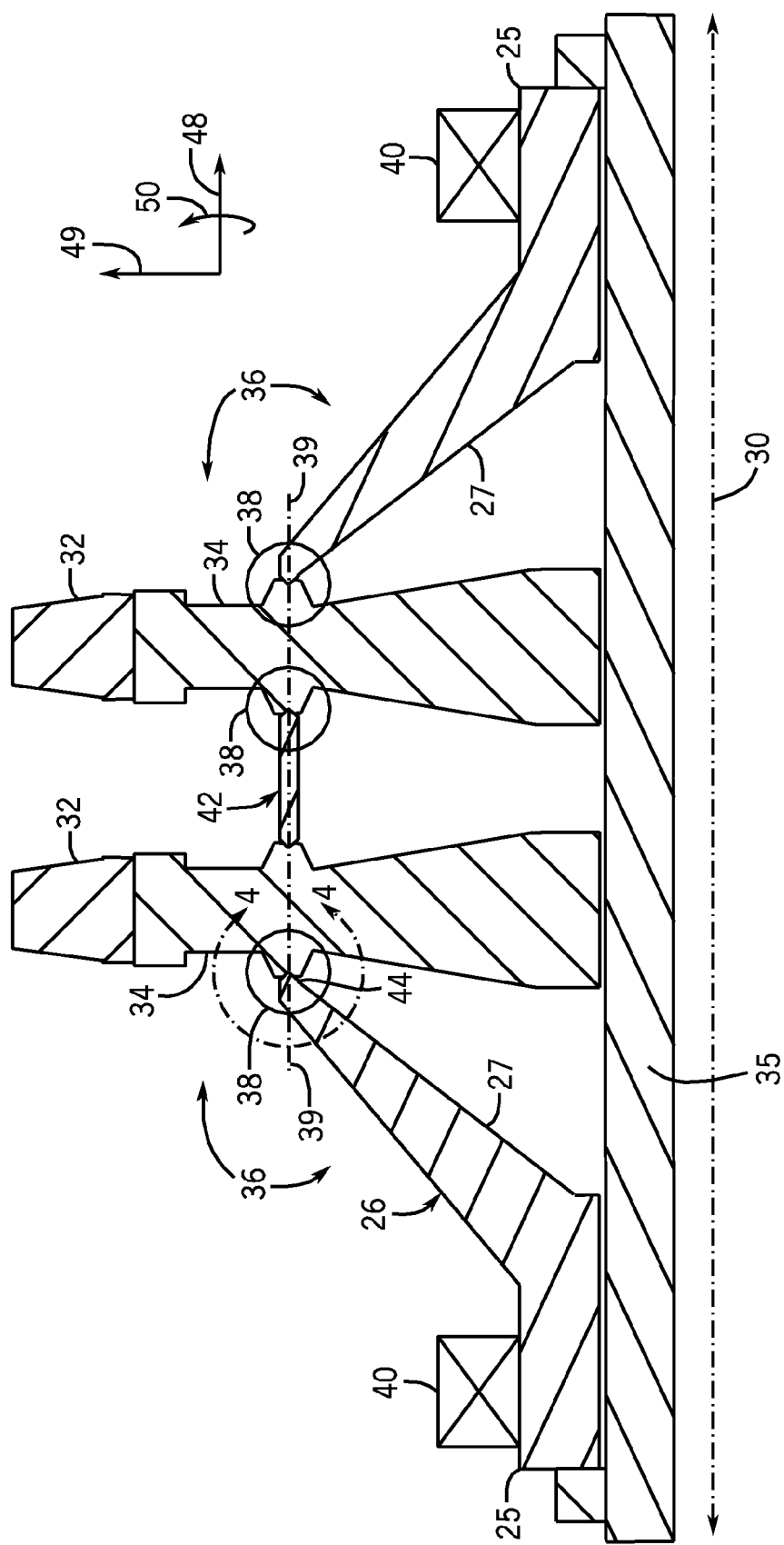
FIG. 3 is a schematic view of the rotary components of a rotor illustrating an alignment and torque transmission coupling in accordance with an embodiment of the present invention.

FIG. 3 is a schematic cross-sectional view of an embodiment of the turbine section 22 taken within arcuate line 3-3 of FIG. 2. As shown in FIG. 3, a two stage gas turbine engine is depicted with various rotary components 36, e.g., shaft 26 and wheels 34 having blades 32, coupled together via an alignment and torque transmission coupling 38. The rotary components 36 may rotate around the rotational axis 30 (FIG. 2), while the coupling 38 provides alignment and torque transmission about a circumferential interface or axis 39. As appreciated, the axis 39 is parallel to the rotational axis 30. The shaft 26 may be coupled to a bearing 40 to enable rotation of the rotary components 36 together. As mentioned above, the center tie bolt 35 may extend through bores of the wheels 34 to axially clamp the rotary components 36. In some embodiments, as shown in FIG. 2, the rotary components 36, e.g., wheels 34, may be coupled together via an intermediate shaft 42 (also referred to as a "spacer") extending between the components 36. The intermediate shaft 42 may also include the coupling 38 to mate the rotary components 36 together. As shown in FIG. 3, the shaft 26 may include a portion that generally expands in an axial direction along the rotational axis towards the rotary components 36 and a non-expanding portion. For example, the shaft 26 may include a cylindrical portion 25 and a conical portion 27. As illustrated, the shaft 26 includes opposite cylindrical and conical portions 25 and 27, which face one another in the axial direction. Thus, the opposite conical portion 27 expands or diverges along the axis 30 toward one another.

The coupling 38 may include a protrusion 44 configured to mate with a groove 46. As described in detail below, the coupling 38 generally aligns the rotary components axially as indicated by arrow 48, radially as indicated by arrow 49, and circumferentially as indicated by arrow 50. Thus, the coupling 38 may concentrically align the rotary components 36, i.e., make all of the components centered about the same rotational axis 30. Additionally, the coupling 38 may transmit torque between the rotary components 36, e.g., between the shaft 26 and the wheels 34, yet permit slippage in the event of a fault scenario, such as unusually higher torque. As appreciated, the coupling 38 is annular in geometry. Thus, the protrusion 44 and the groove 46 are both annular in geometry. The protrusion 44 and the groove 46 are both annular in geometry. The protrusion 44 and the groove 46 wedge-fit together to facilitate alignment, torque transmission, and fault protection, as discussed further below.

Figure 4:
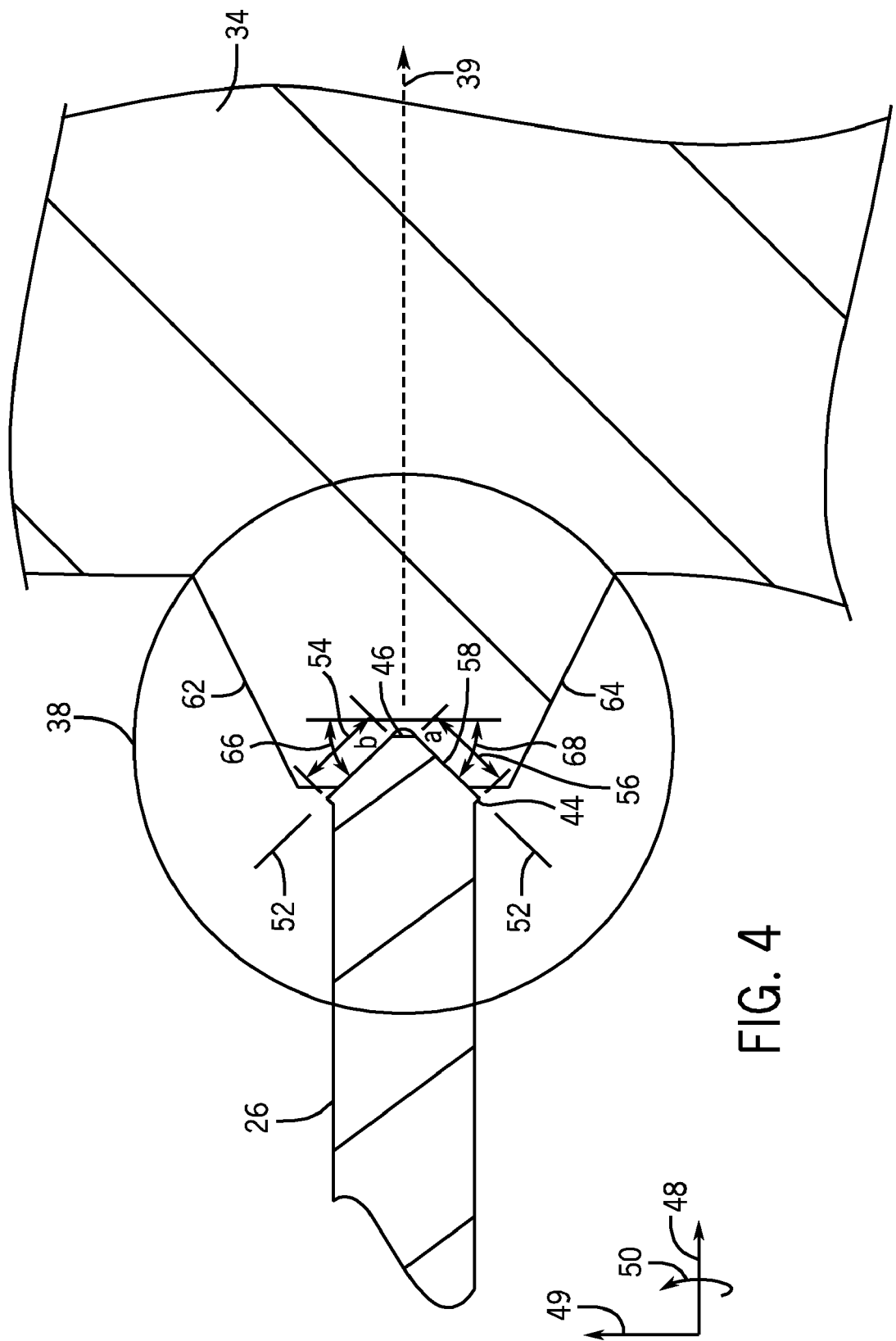
FIG. 4 is a close-up cross-sectional view of the alignment and torque transmission coupling taken within arcuate line 4-4 of FIG. 3 in accordance with an embodiment of the present invention.

FIG. 4 is a close-up cross-section taken within arcuate line 4-4 of FIG. 3, illustrating the coupling 38 in greater detail. As described above, the coupling 38 includes an annular coupling, e.g., protrusion 44, at an end of the shaft 26 that mates with another annular coupling, e.g., groove 46 in the wheel 34. The first annular coupling, e.g., protrusion 44, may have an axially converging surface 52 relative to the axis 39. The axially converging surface 52 may include surfaces of lengths 54 and 56 disposed circumferentially about the shaft 26, as indicated by arrow 50. The second annular coupling, e.g., groove 46, may have an axially diverging surface 58 relative to the axis 39, such that the axially converging surface 52 mates with the axially diverging surface 58 to form the coupling 38. The axially diverging surface 58 may include surfaces having contours 62 and 64 disposed circumferentially around the groove 46. The axially converging surface 52 and axially diverging surface 58 may be described via angles 66 and 68.

In one embodiment, the protrusion 44 may be a circumferential chevron-shaped protrusion, a circumferential tapered protrusion, or other suitably converging surface protrusion.

Similarly, the groove 46 may be a circumferential V-shaped groove, a circumferential tapered groove, or other suitable diverging surface groove.

In certain embodiments, the first annular coupling, e.g., protrusion 44, and the second annular coupling, e.g., groove 46, mate solely by a wedged friction fit. That is, the coupling 38 couples the rotary components 36, e.g., couples the shaft 26 to the wheel 34, solely by the wedged friction between the axially converging surface 52 and the axially diverging surface 58 without any other retention mechanism or components. In this manner, the second annular coupling, groove 46, radially captures the first annular coupling, e.g., the protrusion 44, to block any radial movement and enable alignment in the axial direction 48, the radial direction 49, and the circumferential direction 50. Thus, the coupling 38 may be described as a self-aligning (or "self-centering") friction coupling, which facilitates concentricity. Additionally, the center tie bolt 35 coupled to the rotary components 36 and the shaft 26 may provide axial compression along the axis 30 of the rotary components 36 and the axis 39 of the coupling 38. Alternative forms of axial compression may be achieved via tie bolts not along the center axis, as shown in FIG. 2.

During assembly, as the protrusion 44 moves axially into the groove 46, the V-shaped guides the protrusion 44 and the groove 46 gradually toward the axis 39. As noted above, the axis 39 is parallel to the axis 30. Moreover, the axis 39 is equidistant from the axis 30 in the circumferential direction 50 about the axis 30. As a result, as the protrusion 44 and the groove 46 gradually move together into alignment with the axis 39, the coupling 38 provides alignment of the rotary components 36 in the radial direction 49. Likewise, the coupling 38 aligns the rotary components 36 about the axis 30 in the circumferential direction 50 and along the axis 30 in the axial direction 48. Thus, the coupling 38 may align the rotary components 36 axially and concentrically (i.e., co-center about axis 30). The V-shape of the protrusion 44 and the groove 46 may be described as a wedge-fit, which facilitates this alignment.

Advantageously, assembly of the coupling 38 and mating of the first annular coupling, e.g., protrusion 44, and the second annular coupling, e.g., groove 60, may not use any heating, cooling, or differential temperature changes. In other words, the coupling 38 may be assembled at room temperature in the field. Mating of the protrusion 44 to the groove 46 may include compression of the protrusion 44 wedgingly into the groove 46 via tightening of the center tie bolt 35, providing loading along the axis 39. Further, the protrusion 44 and/or groove 46 may be machined entirely via a lathe to reduce manufacturing costs. During manufacture, assembly, and operation, verification and inspection of the coupling 38 may be simpler as there are fewer surfaces to inspect (as opposed to more complex couplings) and the surfaces are continuous (e.g., annular).

The lengths 54 and 56 of the axially converging surface 52 may be adjusted to control loads during assembly and operation. In certain embodiments, the lengths 54 and 56 may be equal lengths or different lengths. Additionally, the surfaces 62 and 64 may be contoured to control surface contact load distributions on the surfaces 54 and 56. In certain embodiments, the surfaces 62 and 64 may be similarly contoured or differently contoured. Further, either alone or in combination with the above techniques, the angles 66 and 68 may be adjusted to control loads during assembly and operation. The angles 66 and 68 may each have an angle less than 90° (e.g., acutely angled), such as less than about 5°, 10°, 20°, 30°, 40°, 50°, 60°, 70°, 80°, or any combination. The angles 66 and 68 may be the same or different from one another. For example, the angles 66 and 68 may be approximately 45° and 45°, 30° and 30°, 60° and 60°, 30° and 60°, 60° and 30°, and so forth.

Figure 5:
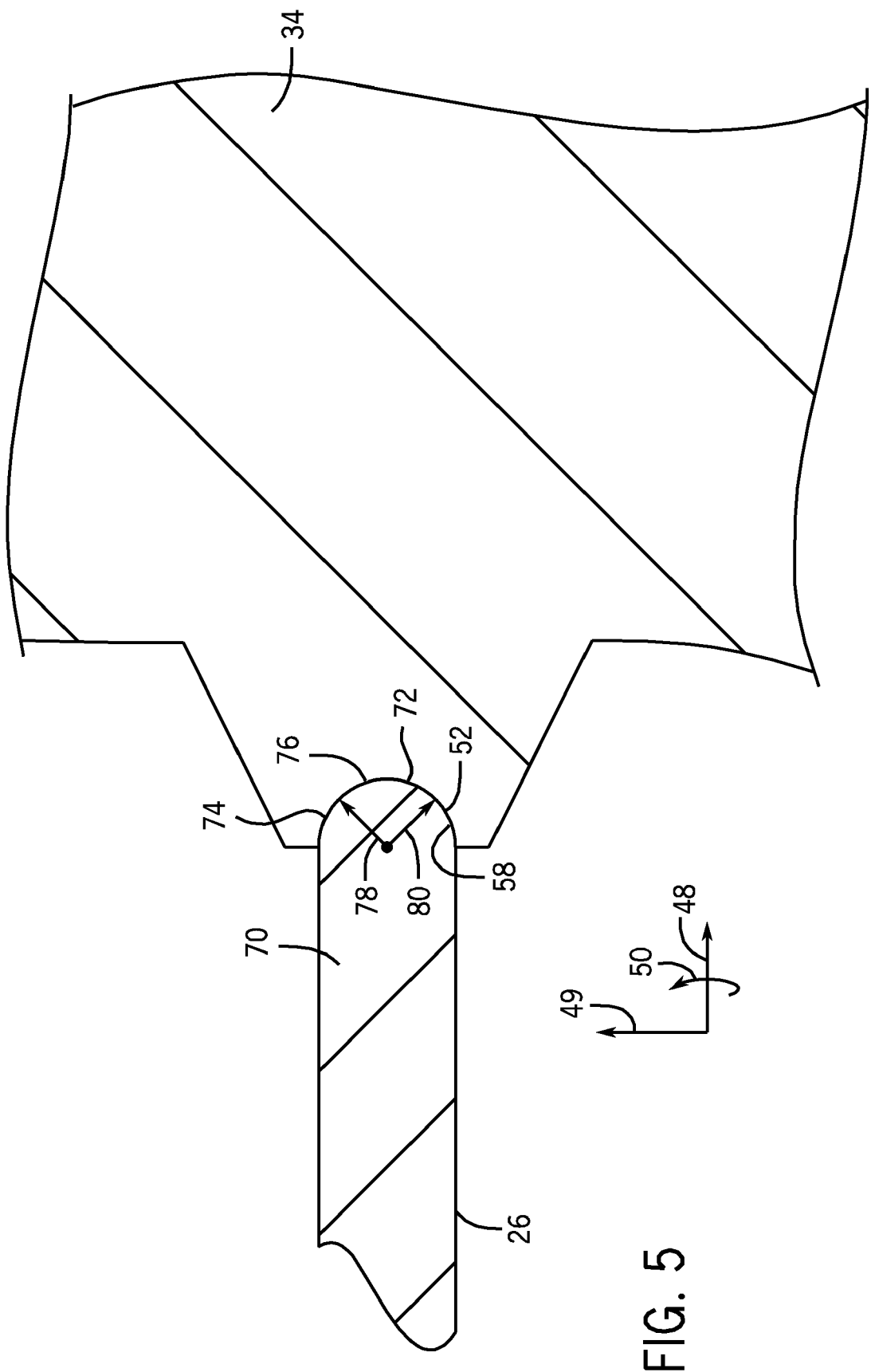
FIG. 5 is a close-up cross-sectional view of the alignment and torque transmission coupling in accordance with an alternate embodiment of the present invention.

FIG. 5 depicts an alternate embodiment of the coupling 38 having a curved protrusion 70 and a curved groove 72. As appreciated, the curved protrusion 70 and the curved groove 72 have the illustrated shape circumferentially about the axis 30 in the circumferential direction 50. Thus, the curved shapes are annular. In the embodiment depicted in FIG. 5, the axially converging surface 52 of the shaft 26 includes the curved protrusion 70 (e.g., a circumferential "C-shaped" surface 74), and the axially diverging surface 58 of the rotary component 36 includes the curved groove 72 (e.g., a generally circumferential C-shaped surface 76). As discussed above, the curved protrusion 70 and curved groove 72 align the shaft 26 and the rotary components 36 in the axial direction 48, in the radial direction 49, and in the circumferential direction 50. Thus, the protrusion 70 and groove 72 make the rotary components 36 concentric. As also mentioned above, the protrusion 70 and curved groove 72 mate solely by a wedged friction fit, enabling torque transmission between the rotary component 36 and the shaft 26. Again, this wedged friction fit enables slippage of the protrusion 70 relative to the curved groove 72 as a failsafe in the event of higher stresses that result in higher torque. This slippage prevents translation of the higher torque to the shaft 26 and/or the rotary components 36, thereby preventing damage (and failure) of those components. The radius 78 of the curved protrusion 70 may be constant along of the surface 74 to create a semi-spherical surface, or the radius 78 may vary along the surface 74 to create a less semi-spherical surface. Similarly, the radius 80 of the curved groove 72 may be constant along the surface 76 or may vary along the surface 76 to form a corresponding mating surface to the protrusion 70.

Figure 6:
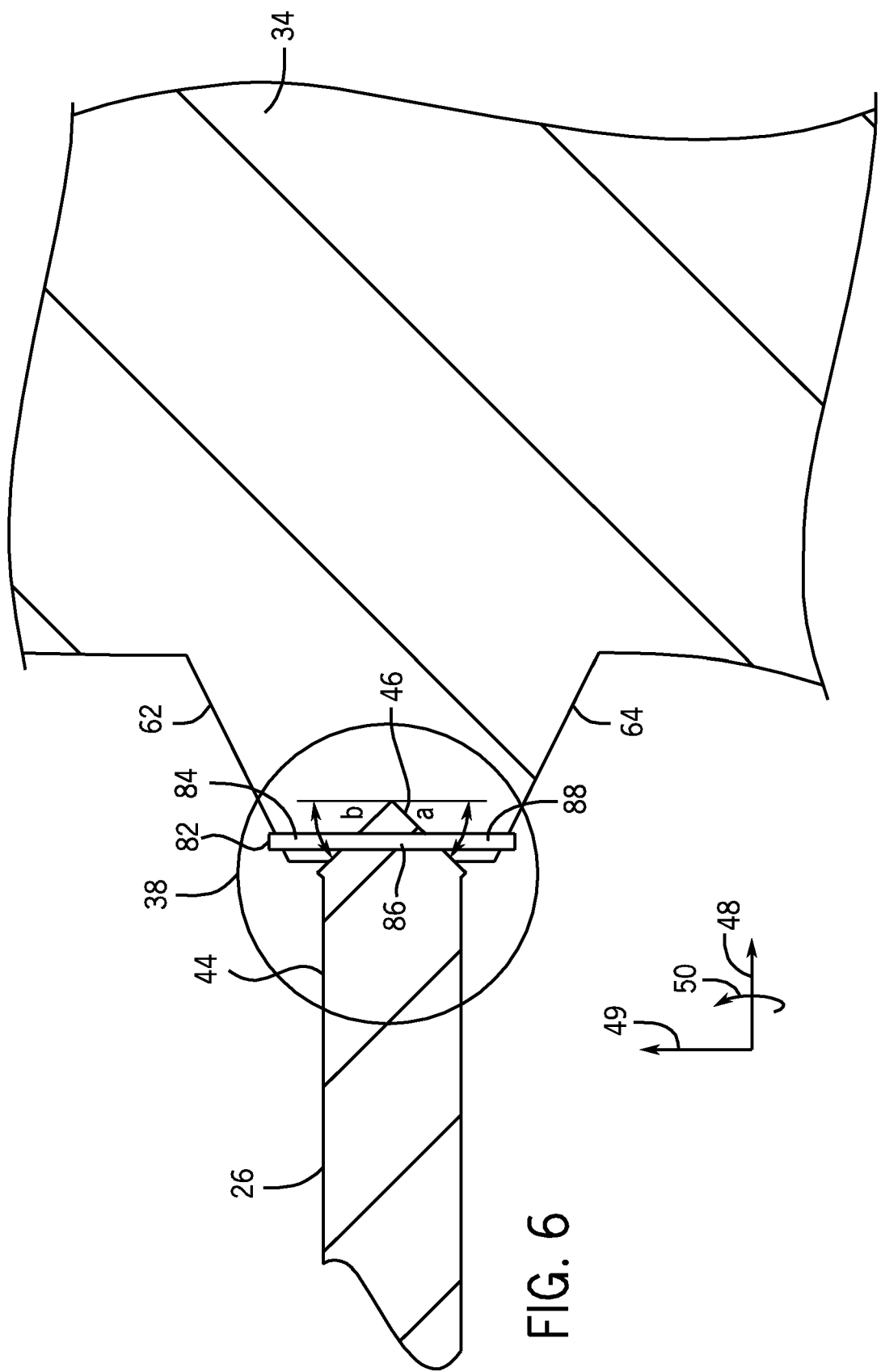
FIG. 6 is close-up cross-sectional view of the alignment and torque transmission coupling and a retaining mechanism in accordance with an alternate embodiment of the present invention.

FIG. 6 depicts an alternate embodiment of the coupling 38 that includes a mechanism for secure torque transmission, such as a pin 82. The pin 82 may extend though the groove 46 and the protrusion 44. In the illustrated embodiment, the pin 82 extends through the groove 46 and the protrusion 44 in the radial direction 49. In some embodiments, the pin 82 may be oriented in the axial direction 48 or the circumferential direction 50. As shown in FIG. 6, the pin 82 may be oriented in the radial direction 50 into a receptacle 84 at the surface 62, through the groove 46 of the rotary component 36, through a receptacle 86 in the protrusion 44 of the shaft 26, and out through a corresponding receptacle 88 at the surface 64. The retaining mechanism may be the pin 82, a bolt, a screw, or any other suitable fastener. The retaining mechanism, e.g., pin 82, may provide further stability of the axial, radial, and circumferential alignment provided by the coupling 38. Additionally, the retaining mechanism, e.g., pin 82, may be a shear pin or other shear fastener to maintain the torque transmission and slippage capabilities discussed above. Thus, the shear pin 82 may be designed to shear at a particular torque value just above the torque required to slip the coupling 38. In this manner, the coupling 38 may still provide slippage at a desired torque value to prevent damage (or failure) of the rotary components 36.

In should be appreciated that the coupling 38 is not limited to application in the gas turbine engine 12 described herein, but may be used in any rotating device having an interface between rotary components. For example, the coupling 38 may be used with turbines having a flanged bolt design, steam turbines, etc. Likewise, the coupling 38 may be used in any rotary machine, such as a generator, an electric motor, a compressor, and so forth.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system, comprising:
   a shaft disposed about a rotational axis, wherein the shaft comprises a first shaft portion and a second shaft portion; and
   a wheel disposed about the rotational axis, wherein the wheel comprises a plurality of blades, the shaft mates with the wheel along an annular interface, the annular interface comprises an annular protrusion captured in opposite radial directions by an annular groove circumferentially about the rotational axis, and the annular interface is disposed between an axial end of the second shaft portion and a first axial side of the wheel.

2. The system of claim 1, wherein the annular interface of the annular protrusion and the annular groove concentrically and axially aligns the shaft with the wheel.

3. The system of claim 1, wherein the annular protrusion comprises a circumferential tapered protrusion, and the annular groove comprises a circumferential tapered groove.

4. The system of claim 3, wherein the circumferential tapered protrusion comprises a curved protrusion, and the circumferential tapered groove comprises a curved groove.

5. The system of claim 3, wherein the circumferential tapered protrusion comprises an acutely angled protrusion, and the circumferential tapered groove comprises an acutely angled groove.

6. The system of claim 1, wherein the second shaft portion radially expands in an axial direction along the rotational axis from the first shaft portion to the wheel.

7. The system of claim 6, comprising an annular support disposed on a second axial side of the wheel opposite from the first axial side, and another annular interface disposed between the annular support and the second axial side, wherein the other annular interface comprises another annular protrusion captured in opposite radial directions by another annular groove circumferentially about the rotational axis.

8. The system of claim 7, wherein the annular interface and other annular interface are axially compressed between the wheel, the shaft, and the annular support.

9. The system of claim 1, comprising a turbine having the shaft and the wheel.

10. The system of claim 9, comprising a gas turbine engine having the turbine.

11. The system of claim 1, comprising a self-aligning friction coupling having the annular interface.

12. The system of claim 11, wherein the annular protrusion and the annular groove of the self-aligning friction coupling are coupled together solely by a friction fit configured to transfer torque.

13. A system, comprising:
    a shaft disposed about a rotational axis; and
    a wheel disposed about the rotational axis, wherein the wheel comprises a plurality of blades, the shaft mates with the wheel along an annular interface, the annular interface comprises an annular protrusion captured in opposite radial directions by an annular groove circumferentially about the rotational axis, and the annular protrusion is configured to mate with the annular groove by moving axially into the annular groove relative to the rotational axis.

14. The system of claim 13, wherein the annular interface of the annular protrusion and the annular groove concentrically and axially aligns the shaft with the wheel, and the annular protrusion and the annular groove are coupled together solely by a friction fit configured to transfer torque.

15. The system of claim 13, wherein the annular protrusion comprises first and second converging annular surfaces, and the annular groove comprises first and second diverging annular surfaces.

16. The system of claim 15, wherein the first and second converging annular surfaces of the annular protrusion define a V-shaped annular protrusion, and the first and second diverging annular surfaces of the annular groove define a V-shaped annular groove.

17. The system of claim 15, wherein the first and second converging annular surfaces of the annular protrusion define a U-shaped annular protrusion, and the first and second diverging annular surfaces of the annular groove define a U-shaped annular groove.

18. The system of claim 13, comprising a turbine having the shaft and the wheel.

19. The system of claim 13, wherein the turbine comprises a gas turbine, a stream turbine, a hydro turbine, or a wind turbine.

20. The system of claim 13, comprising a compressor having the shaft and the wheel.

21. The system of claim 13, comprising a rotary machine having the shaft and the wheel.

22. The system of claim 13, comprising a self-aligning friction coupling having the shaft and the wheel, wherein the annular protrusion and the annular groove of the self-aligning friction coupling are coupled together solely by a friction fit configured to transfer torque.

23. The system of claim 13, comprising a shear pin extending through the annular protrusion and the annular groove.

24. The system of claim 13, wherein the annular interface is disposed between a first axial end portion of the shaft and a second axial end portion of the wheel.

* * * * *